US007961141B2

(12) United States Patent
Dai et al.

(10) Patent No.: US 7,961,141 B2
(45) Date of Patent: Jun. 14, 2011

(54) METHODS AND SYSTEMS TO INCREASE ACCURACY IN THE NAVIGATION OF SINGLE FREQUENCY RECEIVERS

(75) Inventors: Liwen L. Dai, Chino Hills, CA (US); Chaochao Wang, Los Angeles, CA (US); Daniel J. Eslinger, Huntington Beach, CA (US); John Perry Genta, Redondo Beach, CA (US)

(73) Assignee: Navcom Technology, Inc., Torrance, CA (US)

( * ) Notice: Subject to any disclaimer, the term of this patent is extended or adjusted under 35 U.S.C. 154(b) by 113 days.

(21) Appl. No.: 12/331,339

(22) Filed: Dec. 9, 2008

(65) Prior Publication Data

US 2010/0141510 A1 Jun. 10, 2010

(51) Int. Cl.
*G01S 1/02* (2010.01)
*G01S 5/14* (2010.01)

(52) U.S. Cl. ......... 342/357.12; 342/357.02; 342/357.04; 342/357.06; 342/357.15; 342/357.24; 342/357.26; 342/357.31; 342/357.41; 342/357.46; 701/207; 701/213; 701/215

(58) Field of Classification Search ............. 342/357.02, 342/357.04, 357.06, 357.12, 357.15, 357.24, 342/357.26, 357.31, 357.41, 357.46; 701/207, 701/213, 215
See application file for complete search history.

(56) References Cited

U.S. PATENT DOCUMENTS

| 6,127,968 | A | * | 10/2000 | Lu | 342/357.03 |
|---|---|---|---|---|---|
| 2002/0120400 | A1 | * | 8/2002 | Lin | 701/214 |
| 2008/0074319 | A1 | * | 3/2008 | Han et al. | 342/357.04 |
| 2008/0165053 | A1 | | 7/2008 | Liu et al. | 342/357.03 |
| 2009/0135056 | A1 | * | 5/2009 | Dai et al. | 342/357.03 |
| 2009/0135057 | A1 | * | 5/2009 | Vollath et al. | 342/357.03 |

FOREIGN PATENT DOCUMENTS

EP 1248117 10/2002

OTHER PUBLICATIONS

Liwen, D. et al., "Innovative Algorithms to Improve Long Range RTK Reliability and Availability," ION NTM 2007, Jan. 22-24, 2007, pp. 860-872.
International Search Report for International Application No. PCT/US2009/067256, dated Mar. 24, 2010, 17 pages.

(Continued)

*Primary Examiner* — Dao L Phan
(74) *Attorney, Agent, or Firm* — Morgan, Lewis & Bockius LLP (57) ABSTRACT

In a method of mitigating errors in satellite navigation measurements at a satellite navigation receiver, respective single-frequency signals are received from respective satellites in a plurality of satellites in a satellite navigation system. Pseudorange and carrier-phase measurements corresponding to respective received single-frequency signals are calculated. These calculations include filtering the pseudorange and carrier-phase measurements in a Kalman filter having a state vector comprising a plurality of states, including a position state, a receiver clock state, and a plurality of bias states. Each bias state corresponds to a respective satellite in the plurality of satellites. The filtering includes updating the state vector. An estimated position of the satellite navigation receiver is updated in accordance with an update to the state vector.

16 Claims, 4 Drawing Sheets

OTHER PUBLICATIONS

G. Chen et al., "Using IMM Adaptive Estimator in GPS Positioning," Proceedings of the 40th SICE Annual Conf., Piscataway, New Jersey, Jul. 25, 2001, pp. 78-83.

K. Chen et al., "Real-Time Precise Point Positioning Using Single Frequency Data," ION GNSS 18th Int'l Technical Meeting of the Satellite Div., Long Beach, California, Sep. 13, 2005, • I. 1514-1523.

Dai, D. et al., "Optimal Use of Ionospheric Corrections for Wide Area Augmentation System (WAAS) Users," Position, Location, and Navigation Symposium, IEEE 1998, Palm Springs, California, Apr. 20, 1998, pp. 358-365.

Dixon, K., "StarFire™: A Global SBAS for Sub-Decimeter Precise Point Positioning," ION GNSS 19th Int'l Technical Meeting of the Satellite Div., Fort Worth, Texas, Sep. 29, 2006, pp. 2286-2296.

Hwang, P.Y.C., "Kinematic GPS: Resolving Integer Ambiguities on the Fly," IEEE, Mar. 20, 1990, pp. 579-586.

Somieski, A., et al., "Precise Point Positioning with Single-Frequency Mass Market Receivers," ION GNSS 21st Int'l Technical Meeting of the Satellite Div., Savannah, Georgia, Sep. 19, 2008, pp. 1429-1436.

\* cited by examiner

METHODS AND SYSTEMS TO INCREASE ACCURACY IN THE NAVIGATION OF SINGLE FREQUENCY RECEIVERS

TECHNICAL FIELD

The disclosed embodiments relate generally to technologies associated with positioning and navigation systems, such as the Global Positioning System (GPS) or the European Galileo System, and more particularly to Kalman filtering of pseudorange and carrier-phase measurements in single-frequency satellite navigation receivers.

BACKGROUND

A wide-area navigation system, such as the Global Positioning System (GPS), uses a constellation of satellites to position or navigate objects on earth. Each satellite in the GPS system currently transmits two carrier signals, L1 and L2, with frequencies of 1.5754 GHz and 1.2276 GHz, and wavelengths of 0.1903 m and 0.2442 m, respectively. Next generation Global Navigation Satellite Systems (GNSSs), such as the modernized GPS and Galileo systems, will offer a third carrier signal: L5. In the GPS system, L5 will have a frequency of 1.1765 GHz, and a wavelength of 0.2548 m.

Two types of GPS measurements are usually made by a GPS receiver: pseudorange measurements and carrier phase measurements. The pseudorange measurement (or code measurement) is a basic GPS observable that all types of GPS receivers can make. It utilizes the C/A or P codes modulated onto the carrier signals. With the GPS measurements available, the range or distance between a GPS receiver and each of a plurality of satellites is calculated by multiplying a signal's travel time (from the satellite to the receiver) by the speed of light. These ranges are usually referred to as pseudoranges because the GPS measurements may include errors due to various error factors, such as satellite clock timing error, ephemeris error, ionospheric and tropospheric refraction effects, receiver tracking noise and multipath error, etc. To eliminate or reduce these errors, differential operations are used in many GPS applications. Differential GPS (DGPS) operations typically involve a base reference GPS receiver, a user GPS receiver, and a communication mechanism between the user and reference receivers. The reference receiver is placed at a known location and is used to generate corrections associated with some or all of the above error factors. Corrections generated at the reference station, or raw data measured at the reference station, or corrections generated by a third party (e.g., a computer or server) based on information received from the reference station (and possibly other reference stations as well) are supplied to the user receiver, which then uses the corrections or raw data to correct its computed position.

The carrier phase measurement is obtained by integrating a reconstructed carrier of the signal as it arrives at the receiver. Because of an unknown number of whole cycles in transit between the satellite and the receiver when the receiver starts tracking the carrier phase of the signal, there is a whole-cycle ambiguity in the carrier phase measurement. This whole-cycle ambiguity must be resolved in order to achieve high accuracy in the carrier phase measurement. Whole-cycle ambiguities are also known as "integer ambiguities" after they have been resolved, and as "floating ambiguities" prior to their resolution.

Use of single-frequency satellite navigation receivers that receive only one of the available frequencies (e.g., L1) in a satellite navigation system is desirable for positioning and navigation applications, because single-frequency receivers are low cost. However, performing accurate positioning and navigation with single-frequency receivers presents significant engineering challenges. For example, the absence of multiple frequencies reduces the receiver's ability to compensate for delays in carrier signal transmission. Furthermore, in some applications, referred to as stand-alone applications, differential corrections are not available. Accordingly, there is a need for single-frequency receivers with high accuracy in a satellite navigation system.

SUMMARY

In some embodiments, a method of mitigating errors in satellite navigation measurements is performed at a satellite navigation receiver. In the method, respective single-frequency signals are received from respective satellites in a satellite navigation system. Pseudorange and carrier-phase measurements corresponding to respective received single-frequency signals are calculated. These calculations include filtering the pseudorange and carrier-phase measurements in a Kalman filter having a state vector that includes a plurality of states, including a position state, a receiver clock state, and a plurality of bias states. Each bias state corresponds to a respective satellite in the plurality of satellites. The filtering includes updating the state vector. An estimated position of the satellite navigation receiver is updated in accordance with an update to the state vector.

In some embodiments, a satellite navigation receiver includes an antenna to receive respective single-frequency signals from respective satellites in a plurality of satellites in a satellite navigation system. The satellite navigation receiver also includes memory, one or more processors, and one or more programs stored in the memory and configured for execution by the one or more processors. The one or more programs include instructions to calculate pseudorange and carrier-phase measurements corresponding to respective received single-frequency signals, including instructions to filter the pseudorange and carrier-phase measurements in a Kalman filter having a state vector that includes a plurality of states. The plurality of states includes a position state, a receiver clock state, and a plurality of bias states. Each bias state corresponds to a respective satellite in the plurality of satellites. The instructions to filter include instructions to update the state vector. The one or more programs also include instructions to update an estimated position of the satellite navigation receiver in accordance with an update to the state vector.

In some embodiments, a computer readable storage medium stores one or more programs for use in a satellite navigation receiver that receives respective single-frequency signals from respective satellites in a plurality of satellites in a satellite navigation system. The one or more programs are configured to be executed by one or more processors in the satellite navigation receiver. The one or more programs include instructions to calculate pseudorange and carrier-phase measurements corresponding to respective received single-frequency signals, including instructions to filter the pseudorange and carrier-phase measurements in a Kalman filter having a state vector that includes a plurality of states. The plurality of states includes a position state, a receiver clock state, and a plurality of bias states. Each bias state corresponds to a respective satellite in the plurality of satellites. The instructions to filter include instructions to update the state vector. The one or more programs also include instructions to update an estimated position of the satellite navigation receiver in accordance with an update to the state vector.

BRIEF DESCRIPTION OF THE DRAWINGS

Like reference numerals refer to corresponding parts throughout the drawings.

DESCRIPTION OF EMBODIMENTS

Reference will now be made in detail to various embodiments, examples of which are illustrated in the accompanying drawings. In the following detailed description, numerous specific details are set forth in order to provide a thorough understanding of the present inventions. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1:
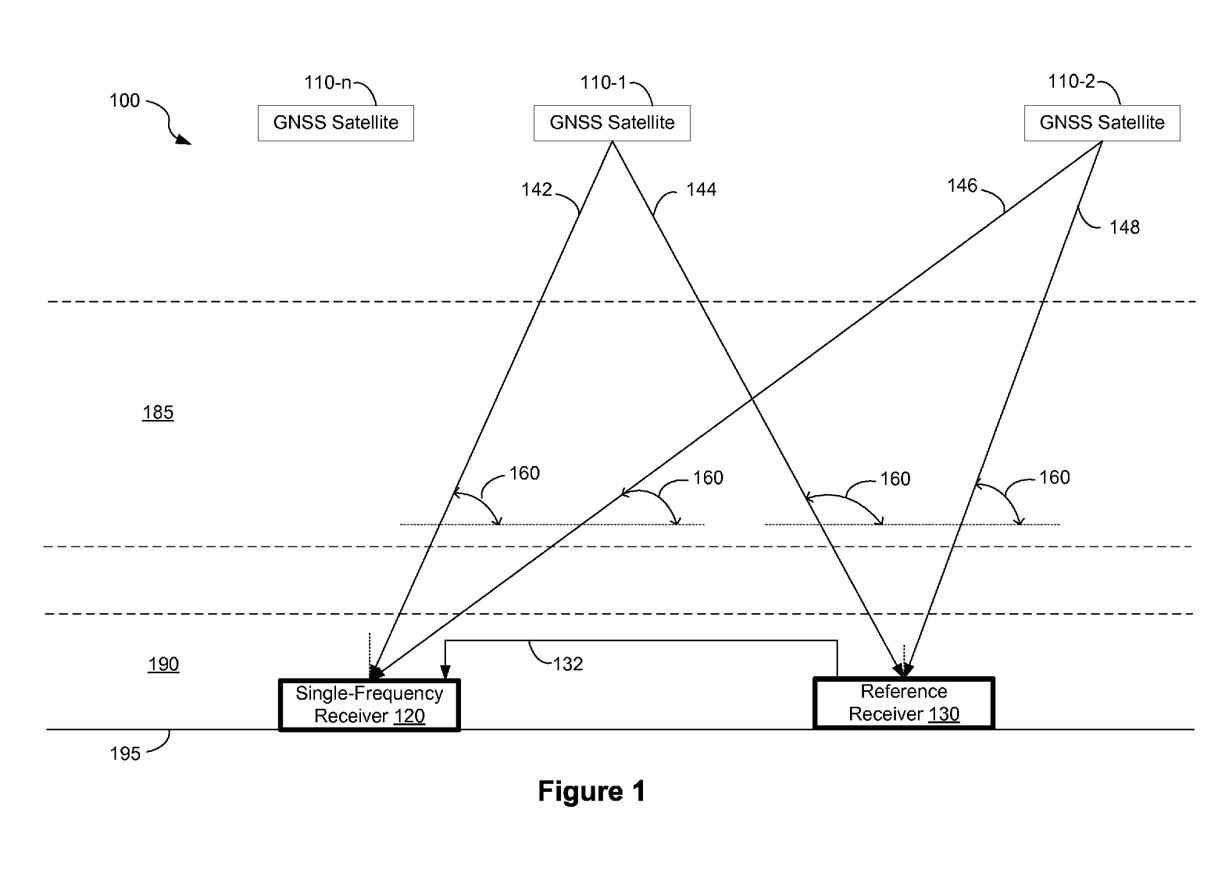
FIG. 1 illustrates a global navigation satellite system in accordance with some embodiments.

FIG. 1 illustrates a global navigation satellite system (GNSS) 100 in accordance with some embodiments. The GNSS 100 includes a plurality of satellites 110-1, 110-2, ..., 110-$n$, where n is the number of satellites in view of a single-frequency receiver 120. The GNSS 100 also includes additional satellites not currently in view of the single-frequency receiver 120. The plurality of satellites 110-1 through 110-$n$, or any one or more of them, is sometimes referred to hereafter in this document as satellites(s) 110. In some embodiments, the single-frequency receiver 120 is a mobile receiver. For example, the single-frequency receiver may be part of a personal navigation system, a vehicle navigation system, or a machine-control system for controlling a mobile machine such as a tractor. Alternatively, the single-frequency receiver 120 may be substantially stationary. For example, the single-frequency receiver 120 may be mounted on a fixed buoy or on a structure for which it monitors structural deformation. (As used herein, the term "satellite navigation receiver" includes receivers that are substantially stationary or have a substantially fixed position, as well as mobile receivers).

The single-frequency receiver 120 takes code (i.e., pseudorange) and carrier phase measurements of the GPS signals 142 and 146 received from respective satellites 110. While the GPS signals 142 and 146 each include multiple carrier signals on multiple respective frequencies (e.g., L1 and L2, or L1, L2, and L5), the single-frequency receiver only receives and takes code and carrier-phase measurements of one of the carrier signals on a single frequency. For example, the single-frequency receiver 120 takes code and carrier phase measurements of the L1 component of the GPS signal 142 received from the satellite 110-1 and of the L1 component of the GPS signal 146 received from the satellite 110-2. While the description in this document frequently uses the terms "GPS" and "GPS signals" and the like, the description is equally applicable to other GNSS systems and the signals from the GNSS satellites in those systems.

In some embodiments, differential measurement corrections from one or more reference receivers 130 are provided to the single-frequency receiver 120. Each reference receiver 130, which has a previously established position, takes code and/or carrier phase measurements of the GPS signals (e.g., 144 and 148) received from the satellites 110 and generates corrections 132 to those measurements, based at least in part on the previously established location of the reference receiver. The corrections 132 are then communicated to the single-frequency receiver 120, either by direct broadcast or indirectly through a broadcast system.

In some embodiments, the reference receivers 130 only provide pseudorange corrections and do not provide corrections to carrier-phase measurements. For example, the reference receivers 130 may be part of a local differential navigation system (e.g., a Radio Technical Commission for Maritime Services (RTCM)-compliant correction system implemented using U.S. Coast Guard beacons). In another example, the reference receivers 130 are part of a regional navigation augmentation system that provides pseudorange corrections (e.g., WAAS, EGONAS, or MSAT). The regional system may route the corrections through master stations to satellites that broadcast the corrections, instead of broadcasting them directly from the reference receivers 130 to the single-frequency receiver 120.

In some embodiments, the reference receivers 130 provide both pseudorange and carrier phase correction. For example, the reference receivers 130 may be part of the STARFIRE® (a registered trademark of Deere & Co.) system or of the High Accuracy-National Differential (HA-ND) GPS system under development by the U.S. government.

In some embodiments, one or more reference receivers 130 are implemented as ground-based receivers with known positions, as illustrated in FIG. 1. For example, ground-based receivers may provide local or regional navigation augmentation. Alternatively, one or more reference receivers 130 are implemented as geostationary satellites for augmenting navigation.

In some embodiments, referred to as stand-alone applications, no measurement corrections from any reference receivers 130 are available.

GPS signals 142, 144, 146, and 148 are transmitted by the satellites 110 through the ionosphere 185 and the troposphere 190 of earth.

The troposphere 190 extends from earth's surface 195 up to about 16 km in height and is composed of dry gases ("the dry component") and water vapor ("the wet component"). The GPS signals 142, 144, 146, 148 are refracted by the troposphere 190. The troposphere is a non-dispersive medium and therefore the refraction of the GPS signals 142, 144, 146, 148 does not depend on their frequency. The magnitude of the tropospheric delay is dependent upon the satellite elevation angle 160 from the receiver to the satellite. The tropospheric delay is equal to about 2.3 m in the zenith direction (an elevation angle 160 of 90 degrees) and increases to over 25 m for an elevation angle 160 of five degrees. The troposphere error can be mitigated using different models such as the UNB, Hopfield, or Saastamoinen models. The dry component can be modeled with high accuracy, but the smaller wet component is much more difficult to model. After applying a model, the remaining troposphere error, principally the wet component, will typically vary between 0 and 30 cm. Residual tropospheric bias may be represented using models for the zenith delay and a mapping function to obtain the delay at a given satellite elevation angle. The temporal characteristics of the residual tropospheric delay, which are mostly due to water vapor fluctuation in the atmosphere, can be characterized by probabilistic laws or statistical models. The effects of the troposphere on radio wave propagation then can be predicted over varying temporal scales according to a given probability density function or stochastically in terms of the temporal correlations of the fluctuations. In general, the residual tropospheric delay can be considered first-order Gauss-Markov.

The ionosphere 185 starts at about 50 km above earth's surface 195 and extends to heights of 1000 km or more. Solar radiation in the ionosphere 185 causes atoms to ionize such that free electrons exist in sufficient quantities to significantly affect the propagation of radio waves. The ionosphere 185 advances the carrier phase, which causes the carrier phase measurements to be decreased, but delays the code modulation, which causes the code (i.e., pseudorange) measurements to be increased. The magnitude of the ionospheric delay is dependent upon the frequency of the signal and upon solar radiation effects. Therefore, the ionospheric delay is different for daytime and nighttime and from one season to another. Diurnally, the ionospheric delay usually reaches a first peak at approximately 14:00 local time, a second peak at approximately 22:00 local time, and drops to a minimum just before sunrise. Under extreme conditions, the ionospheric delay can reach 15 m in the zenith direction and more than 200 m at elevations near the horizon. In some embodiments, the satellites 110 broadcast correction data (e.g., coefficients of the Klobuchar model) that enable single-frequency receivers 120 to remove, on average, about fifty percent of the ionospheric refraction effects.

The single-frequency receiver 120 includes a Kalman filter for updating the position and other aspects of the state (i.e., the Kalman filter state) of the receiver 120. The Kalman filter state actually includes many states, each of which represents an aspect of the single-frequency receiver 120's position (e.g., X, Y, and Z, or latitude, longitude, and zenith components of position), or motion (e.g., velocity and/or acceleration), or the state of the computational process that is being used in the Kalman filter. For example, the Kalman filter may include a state for the clock of the single-frequency receiver 120 ("receiver clock"), a state for the clock rate of the single-frequency receiver 120 ("receiver clock rate"), a plurality of bias states corresponding to respective satellites 110, and/or a residual tropospheric bias state.

The Kalman filter is typically a procedure, or set of procedures, executed by a processor. The Kalman filter is executed repeatedly (e.g., once per second), each time using new code measurements (also called pseudorange measurements) and carrier phase measurements, to update the Kalman filter state. While the equations used by Kalman filters are complex, Kalman filters are widely used in the field of navigation, and therefore only those aspects of the Kalman filters that are relevant to the present embodiments need to be discussed in detail. It should be emphasized that while Kalman filters are widely used in GPS receivers and other navigation systems, many aspects of those Kalman filters will vary from one implementation to another. For instance, the Kalman filters used in some GPS receivers may include states that are not included in other Kalman filters, or may use different equations than those used in other Kalman filters.

As stated above in regard to FIG. 1, the single-frequency receiver receives signals (e.g., 142, 146) at a single frequency (e.g., L1) from the satellites 110 and calculates code (i.e., pseudorange) and carrier-phase measurements based on the received signals. These code and carrier phase measurements can be described by the following equations:

$$P = \rho + c\tau_R - c\tau^S + d_{orb} + d_{trop} + d_{iono} + \epsilon(P) \quad (1)$$

$$\lambda\phi = \rho + c\tau_R - c\tau^S + d_{orb} + d_{trop} - d_{iono} + \lambda N + \epsilon(\phi) \quad (2)$$

Where P is the code measurement (i.e., pseudorange); $\lambda$ is the wavelength corresponding to the frequency f of the received signal; $\phi$ is the measured carrier phase in cycle units (Hertz) of the frequency f; $\rho$ is the true geometric range between receiver and satellite (m); c is the speed of light (m/s); $\tau^S$ is the satellite clock error (s); $\tau_R$ is the receiver clock error (s); $d_{orb}$ is the satellite orbit error (m); $d_{trop}$ is the tropospheric delay (m); $d_{iono}$ is the ionospheric delay for the frequency f; N is the integer phase ambiguity of the carrier-phase measurement $\lambda\phi$; and $\epsilon(P)$ and $\epsilon(\phi)$ are the remaining errors including noise and multipath for pseudorange and carrier phase respectively.

In accordance with the Kalman filter, linearization of the zero differenced carrier phase and pseudorange observables in Equations (1-2) can be represented by Equation (3):

$$V = HX - Z \quad (3)$$

where V is the post-fit residual, Z is the prefit residual or innovation, and H is the design matrix. X is the estimated state vector, which includes a plurality of states. In some embodiments, the state vector X includes a three-dimensional receiver position state, a receiver clock state, and a plurality of bias states, wherein each bias state of the plurality of bias states corresponds to a respective satellite 110 in the GNSS 100. In some embodiments, the state vector X further includes one or more of a three-dimensional receiver velocity state, a receiver clock rate state, and a residual tropospheric bias state, each of which may be turned on or off in accordance with various settings or applications associated with the single-frequency receiver 120. In some embodiments, the residual tropospheric bias state corresponds to a satellite-independent residual tropospheric scale factor.

If the Kalman filter estimates after k-1 epochs are assumed to be $\hat{X}_{k-1}^+$ with covariance the $P_{k-1}^+$, the predicted state vector at the epoch k can be derived by the State Equations (4-5) based on the physical relations:

$$\hat{X}_k^- = \Phi_{k-1,k} X_{k-1}^+ \quad (4)$$

$$P_k^- = \Phi_{k-1,k} P_{k-1}^+ \Phi_{k-1,k}^T + W_k \quad (5)$$

where $\hat{X}_k^-$ is the predicted Kalman filter state vector at epoch k, as propagated to epoch k from epoch k-1; $\Phi_{k,k-1}$ is the transition matrix that relates $X_{k-1}$ to $X_k$; and $W_k$ is the dynamic matrix. In some embodiments, sequential elements of the dynamic matrix are white noise sequences.

The updated state and covariance matrices at epoch k are given by the following equations:

$$\hat{X}_k^+ = \hat{X}_k^- + KZ \quad (6)$$

$$P_k^+ = (I - KH)P_k^- \quad (7)$$

$$K = P_k^- H(HP_k^- H + R)^{-1} \quad (8)$$

where K is the Gain matrix, R is the covariance of the measurements, and I is the identity matrix.

Position and Velocity States in the Kalman Filter

In some embodiments, when the single-frequency receiver 120 is nearly stationary, such as on a buoy or a system for monitoring structural deformation, the position may be modeled as a random-walk process with three coordinate parameters in the Kalman state vector. The transition matrix and dynamic noise can be determined based upon the random walk model:

$$\Phi_{k,k-1} = e^{F(t_k - t_{k-1})} = 1 \quad (9)$$

$$Q_k = \sigma_p^2 (t_k - t_{k-1}) \quad (10)$$

where $\sigma_p^2$ is the dynamic noise value associated with the position state in the Kalman state vector.

In some embodiments, when the single-frequency receiver 120 is moving with nearly constant velocity, the velocity may be modeled as a random-walk process with three coordinate parameters and three velocity parameters in the Kalman state vector. The transition matrix and dynamic noise are based upon an integrated random walk model:

$$\phi_{k,k-1} = \begin{bmatrix} 1 & (t_k - t_{k-1}) \\ 0 & 1 \end{bmatrix} \quad (11)$$

$$Q_k = \sigma_V^2 \begin{bmatrix} \frac{(t_k - t_{k-1})^3}{3} & \frac{(t_k - t_{k-1})^2}{2} \\ \frac{(t_k - t_{k-1})^2}{2} & (t_k - t_{k-1}) \end{bmatrix} \quad (12)$$

where $\sigma_V^2$ is the dynamic noise value associated with the velocity state in the Kalman state vector.

Parameters for the velocity random walk process may be estimated based on expected dynamics of the single frequency receiver 120. In many vehicular applications, random perturbations to the position and/or velocity are greater in the horizontal plane than in the vertical plane. This can be accounted for by selecting a value of the dynamic noise that is smaller for the altitude coordinate than for the other two horizontal coordinates.

Residual Tropospheric Bias State

In some embodiments, the state vector X includes a residual tropospheric bias state distinct from the plurality of bias states that correspond to respective satellites 110. The residual tropospheric bias state may be implemented as a scaling factor for the zenith delay, referred to as the Residual Tropospheric Zenith Delay (RTZD) scale factor. This scaling factor subsumes all deviations of the tropospheric conditions from standard conditions as modeled, for example, using standard tropospheric models such as the UNB, Hopfield, or Saastamoinen models. After application of a model to correct for tropospheric delay, the residual tropospheric delay T may be approximated using Equation (13) as a function of the RTZD scale factor and a mapping function with respect to the satellite elevation angle 160:

$$T = RTZD*Trop/MF(Elev) \quad (13)$$

Where MF is the mapping function, Elev is the computed satellite elevation angle 160 and Trop is the tropospheric delay computed by a standard tropospheric model. For all elevations of a satellite the residual tropospheric delay T will be scaled by the mapping function MF based upon the satellite elevation angle 160 as computed in accordance with the location of the single-frequency receiver 120. Empirically, the residual zenith tropospheric delay may be modeled as a first-order Gauss-Markov process. The transition matrix and dynamic model for the residual tropospheric bias state are then derived as:

$$\phi_{k,k-1} = e^{-\beta_{trop}(t_k - t_{k-1})} \quad (14)$$

$$Q_k = \frac{\sigma_{trop}^2}{2\beta_{trop}}(1 - e^{-2\beta_{trop}(t_k - t_{k-1})}) \quad (15)$$

where $1/\beta_{trop}$ defines the correlation time of the residual tropospheric delay scale factor and $\sigma_{trop}^2$ represents the variance of that scale factor. In some embodiments, these parameters typically are determined by user-defined settings. The parameter $\beta_{trop}$ typically ranges from 0.5 to 2 hours and $\sigma_{trop}^2$ from $10^{-8}$ to $10^{-9}$ m$^2$/sec.

Satellite Orbital Error Mitigation from Navigation Augmentation Systems

Satellite orbital error results from uncertainties in the orbital information regarding the satellites 110. These uncertainties are due to the predicted nature of the ephemeris broadcast by the satellites, which includes Keplerian orbital elements and time derivatives for these elements. The ephemeris data is generated using measurements from GPS system reference stations and is typically updated once every two hours. Tests have shown that satellite orbit error varies from 1 to 5 meters. Several differential GPS systems (e.g., STAR-FIRE®, WADGPS, or HA-ND GPS) currently supply or are planned to supply measurements or measurement corrections that can be used in a satellite navigation receiver to improve accuracy. In some embodiments, use of such a system allows the single-frequency receiver 120 to achieve positioning accuracies of less than one meter after the carrier-phase floating ambiguities have been determined to sufficient accuracy. If these corrections are available, they may be applied in equations 1-2 for carrier phase and pseudorange measurements and thereby mitigate orbital errors.

Bias States

Depending upon the type of correction data available, (e.g., local, regional, wide area, or global corrections, or no correction data), the respective bias states in the state vector X of the Kalman filter, which correspond to respective satellites 110, account for different sources of error and corrections will be applied to pseudorange and carrier phase equations (1)-(2) differently.

In some embodiments, for standalone navigation or positioning applications in which no differential corrections are available, the bias states account for the ambiguity, residual satellite clock bias after application of the broadcast satellite clock value (e.g., after application of the broadcast GPS a0, a1, and a2 coefficients), residual orbital errors after application of broadcast ephemeris data, and residual ionospheric delay after application of ionospheric model corrections. In some embodiments, the residual tropospheric bias state is not enabled and the respective bias states further account for residual tropospheric delay after application of tropospheric model corrections.

In some embodiments, pseudorange corrections (e.g., supplied by a local or regional navigation augmentation system) are only applied to the code measurements represented by equation (1) and not to carrier-phase measurements represented by equation (2), because the ionospheric delay of the code measurement is opposite that of the carrier phase measurement and the code measurement has much higher noise compared to the more precise carrier phase measurements. In these embodiments, the bias states corresponding to respective satellites 110 include the ambiguity, residual satellite clock bias after application of the broadcast satellite clock value (e.g., after application of the broadcast GPS a0, a1, and a2 coefficients) and of the pseudorange corrections, residual orbital errors after application of broadcast ephemeris data and of the pseudorange corrections, and residual ionospheric delay after application of ionospheric model corrections and of the pseudorange corrections. In some embodiments, the residual tropospheric bias state is not enabled and the respective bias states further account for residual tropospheric delay after application of tropospheric model corrections and of the pseudorange corrections.

In some embodiments, pseudorange corrections from a regional satellite-based navigation augmentation system (e.g., WAAS, EGONAS, or MSAT) are applied to the orbit, the satellite clock, and the ionospheric delay, even if orbit, satellite clock and ionospheric delay corrections are otherwise available. In some embodiments, the correction resolution provided by pseudorange corrections from regional satellite-based system is approximately 12.5 cm and the bias states may be used to at least partially mitigate these correction quantization effects.

In some embodiments, carrier-phase based corrections are obtained from a regional or global navigation augmentation system (e.g., STARFIRE® or HA-ND GPS). In these embodiments, the respective bias states account for the ambiguity and residual ionospheric delay after application of ionospheric model corrections, assuming the separate residual tropospheric bias state is enabled. In some embodiments, the residual tropospheric bias state is not enabled and the respective bias states further account for residual tropospheric delay after application of tropospheric model corrections.

In some embodiments, the respective bias states are modeled as random walks. The transition matrix and dynamic model for a respective bias state are then given by:

$$\Phi_{k,k-1} = 1 \tag{16}$$

$$Q_k = \delta_{clock+orbit} + \delta_{iono}^2 \tag{17}$$

The dynamic model thus depends on the satellite clock and orbital error $\delta_{clock+orbit}$ and the ionospheric delay $\delta_{iono}$. In some embodiments, $\delta_{clock+orbit}$ is a constant value that ranges from 1-3 mm. The dynamic noise of the ionospheric delay can be represented empirically as:

$$\delta_{iono}^2 = \frac{\delta_0^2 \times Iono}{\sin(Elev)} \tag{18}$$

where Iono is ionospheric zenith delay computed from an ionospheric model and Elev is the elevation angle 160 from a respective satellite 110 to the location of the single-frequency receiver 120. In some embodiments, $\delta_0$ is a constant value that ranges from 1-5 mm. In some embodiments, precise values for $\delta_{clock+orbit}$ and $\delta_{iono}$ are determined empirically by calibrating the single-frequency receiver 120.

Attention is now directed to use of the Kalman filter to adjust for jumps in the measured position of the single-frequency receiver 120. Broadcast ephemeris data is periodically updated. When the single-frequency receiver 120 obtains a new set of ephemeris parameters, a discontinuity between the new and the old set can lead to a position jump. Change in the orbital position vector $\Delta\vec{O}$, projected along the line-of-sight vector $\vec{L}$ to the single-frequency receiver 120 is one source of position jumps. Change in the GPS satellite's clock-drift modeling terms $\Delta\vec{C}$ also may contribute to position jumps. In some embodiments, the single-frequency receiver 120 uses the new ephemeris parameters but accounts for any position jumps associated with the switch to the new ephemeris parameters. The receiver 120 computes a jump in range, on a one-time basis, as a transition to the new ephemeris parameters occurs and adjusts the corresponding Kalman filter bias state (i.e., the bias state corresponding to the satellite for which the range jumped) to counteract the computed jump, as described by Equation (19):

$$\text{Bias} = \text{Bias} - \vec{L} \cdot \Delta\vec{O} - \Delta\vec{C} \tag{19}$$

Counteracting position jumps is particularly important for applications that require high accuracy in calculating a relative position (e.g., with respect to local landmarks), as opposed to the absolute position, of the receiver. For example, positions jumps threaten to disrupt machine-control applications (e.g., machine control of a tractor) that demand consistent relative positioning of the machine being controlled (e.g., high pass-to-pass accuracy). In some embodiments, such applications demand consistency in relative positioning over a period of minutes, tens of minutes, or hours, and the position jump thus is counteracted for the appropriate period of time.

A second potential source of position jumps is the occurrence of a cycle slip or slips in the tracking of the carrier phase by the single-frequency receiver 120. Cycle slip detection techniques are well-known in the art and are incorporated into existing receivers. An example of a cycle slip detection or estimation technique, described in a different context but also applicable to Kalman filters in single-frequency receivers as disclosed in the present application, is provided in L. Dai, D. Eslinger, and T. Sharpe, *Innovative Algorithms to Improve Long Range RTK Reliability and Availability*, Proceedings of the 2007 National Technical Meeting of the Institute of Navigation (Jan. 22-24, 2007), pp. 860-872, which is hereby incorporated by reference in its entirety. In some embodiments, in response to detection of a cycle slip with respect to a particular satellite 110, the Kalman filter bias state corresponding to that satellite is reset.

Figure 2:
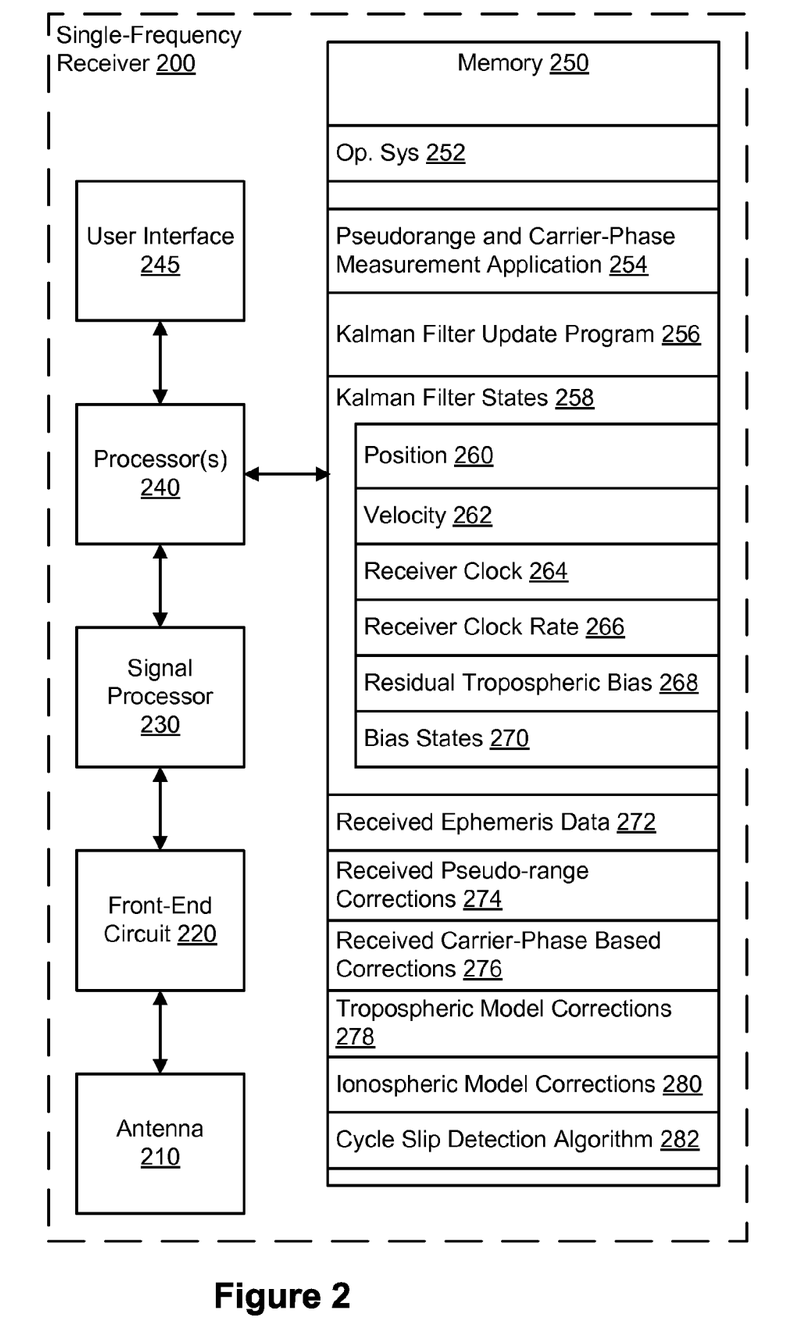
FIG. 2 is a block diagram illustrating a single-frequency receiver in accordance with some embodiments.

FIG. 2 is a block diagram illustrating a single-frequency receiver 200 in accordance with some embodiments. The single-frequency receiver 200 is an example of an implementation of a single-frequency receiver 120 (FIG. 1). In some embodiments, the various physical components of the single-frequency receiver 200 as illustrated in FIG. 2 are integrated into a single device within a single housing, such as a portable, handheld, or even wearable position tracking device, or a vehicle-mounted or otherwise mobile positioning and/or navigation system. In other embodiments, the various physical components of the single-frequency receiver 200 are not integrated into a single device.

The single-frequency receiver 200 includes an antenna 210 and front-end circuit 220 for receiving single-frequency carrier signals (e.g., 142 and 146) from satellites 110, a signal processor 230, one or more processors 240, a memory 250, and a user interface 245 (e.g., a display screen to display calculated positions of the receiver 200). The memory 250 may include high-speed random access memory, such as DRAM, SRAM, or other random access solid-state memory devices, and may include non-volatile memory, such as one or more magnetic disk storage devices, optical disk storage devices, flash memory devices, or other non-volatile solid-state storage devices. Memory 250, or alternately the non-volatile memory device(s) within memory 250, comprises a computer readable storage medium. In some embodiments, memory 250 stores the following programs, modules, data structures, and data, or a subset thereof:

- an operating system 252 that includes procedures for handling various basic system services and for performing hardware-dependent tasks;
- a pseudorange and carrier-phase measurement application 254 for performing pseudorange and carrier-phase measurement calculations (e.g., in accordance with Equations (1) and (2));
- a Kalman filter update program 256 for updating states of the Kalman filter (e.g.; in accordance with Equations (3)-(8));
- Kalman filter states 258;
- received ephemeris data 272;
- received pseudorange corrections 274;
- received carrier-phase based corrections 276;

tropospheric model corrections 278;
ionospheric model corrections 280; and
a cycle slip detection algorithm 282 for detecting cycle slips in carrier-phase measurements.

In some embodiments, the Kalman filter states include a position state 260, a velocity state 262, a receiver clock state 264, a receiver clock rate state 266, a residual tropospheric bias state 268, and/or a plurality of bias states 270 corresponding to respective satellites 110. In some embodiments, the elements 252-282 (or a subset thereof) enable the receiver 200 to perform the method 300 (FIGS. 3A-3C, below).

Each of the above identified elements 252-282 in FIG. 2 may be stored in the computer readable storage medium of memory 250, in one or more of the previously mentioned memory devices. Each of the above identified programs or modules corresponds to a set of instructions, configured for execution by the one or more processors 240, for performing a function described above. The above identified programs or modules (i.e., sets of instructions) need not be implemented as separate software programs, procedures, or modules, and thus various subsets of these programs or modules (or sets of instructions) may be combined or otherwise re-arranged in various embodiments. In some embodiments, memory 250 may store a subset of the modules and data structures identified above. Furthermore, memory 250 may store additional modules and data structures not described above.

Figure 3A:
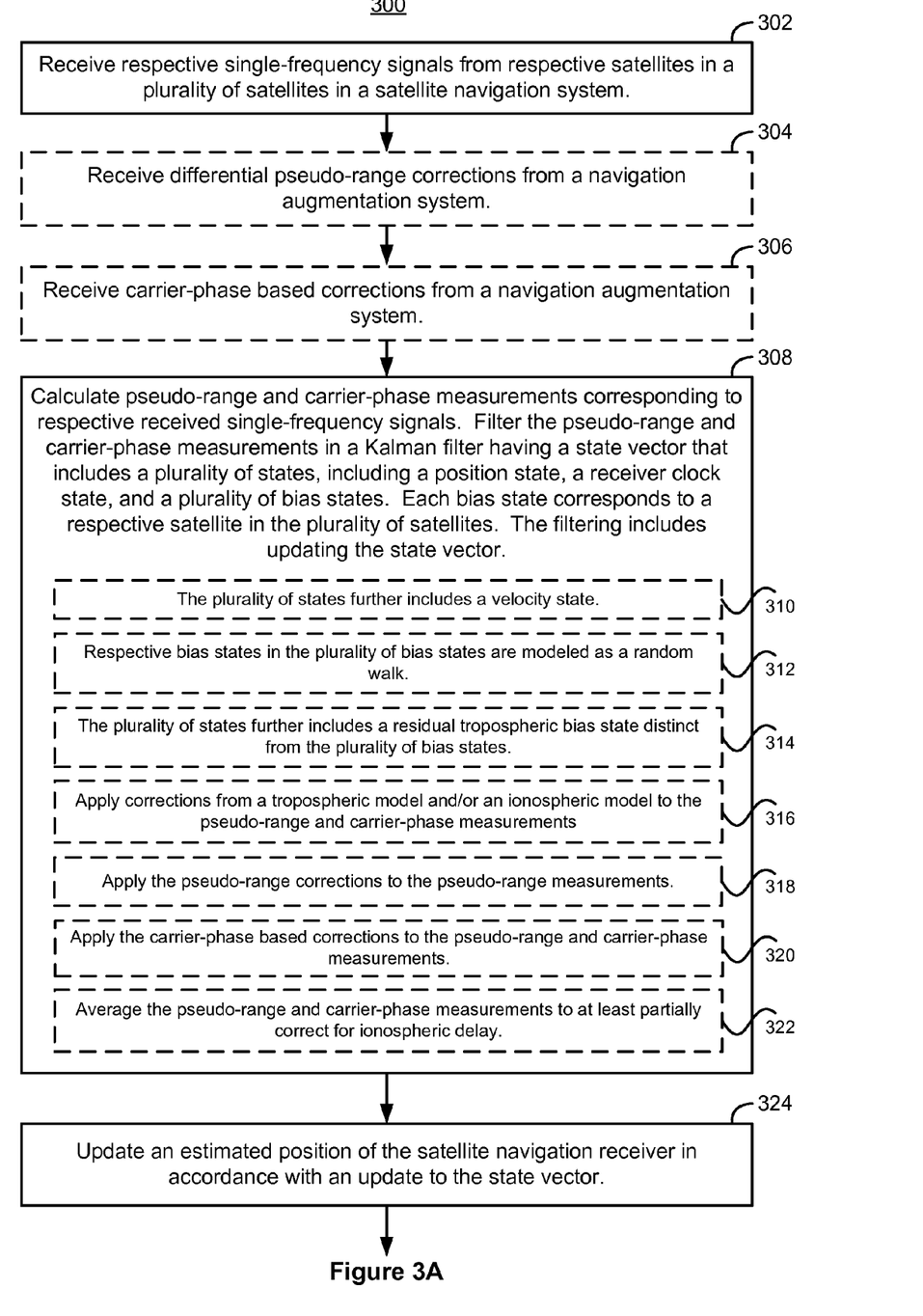
FIGS. 3A-3C are flow diagrams illustrating a method 300 of mitigating errors in satellite navigation measurements in accordance with some embodiments.
Figure 3B:
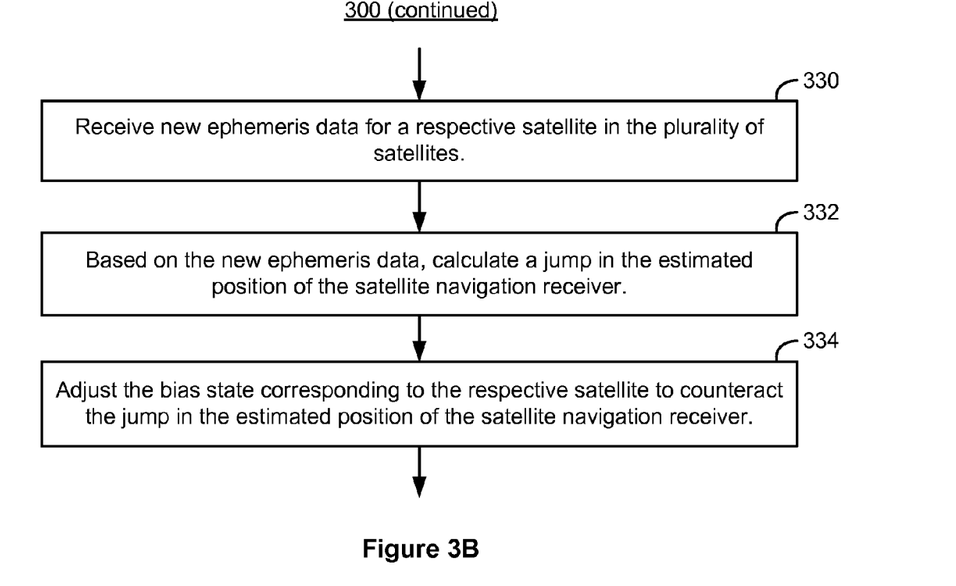
Figure 3C:
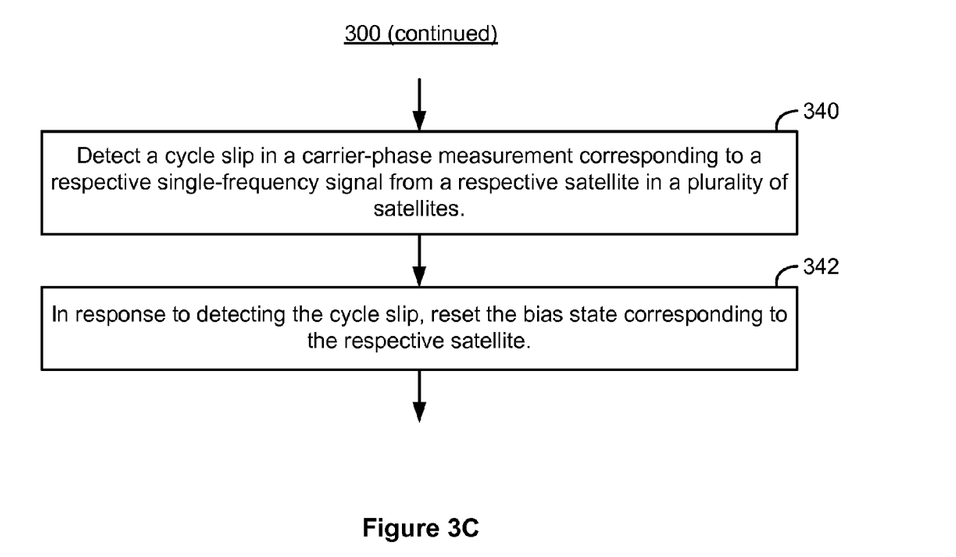

FIGS. 3A-3C are flow diagrams illustrating a method 300 of mitigating errors in satellite navigation measurements in accordance with some embodiments. The method 300 may be performed at a satellite navigation receiver (e.g., a single-frequency receiver 120, FIG. 1, such as a single-frequency receiver 200, FIG. 2).

Respective single-frequency signals (e.g., signals 142 and 146, FIG. 1) are received (302) from respective satellites in a plurality of satellites (e.g., satellites 110-1 through 110-n, FIG. 1) in a satellite navigation system (e.g., GNSS 100, FIG. 1).

In some embodiments, differential pseudorange corrections are received (304) from a navigation augmentation system. For example, the navigation augmentation system may be a local (e.g., RTCM) or regional (e.g., WAAS, EGONAS, or MSAT) differential navigation system that provides differential pseudorange corrections but does not provide carrier-phase based corrections. In some embodiments, the navigation augmentation system is a regional augmentation system that provides pseudorange corrections for ionospheric delays and satellite ephemeris data.

In some embodiments, carrier-phase based corrections are received (306) from a navigation augmentation system (e.g., STARFIRE® or HA-ND GPS). For example, the carrier-phase based corrections may include ephemeris data for the satellite clock and satellite orbit of one or more satellites 110 in the GNSS 100.

Pseudorange and carrier-phase measurements are calculated (308) (e.g., in accordance with Equations (1)-(2)) corresponding to respective received single-frequency signals. The pseudorange and carrier-phase measurements are filtered in a Kalman filter (e.g., in accordance with Equations (3)-(8)) having a state vector that includes a plurality of states, including a position state, a receiver clock state, and a plurality of bias states. Each bias state corresponds to a respective satellite in the plurality of satellites. The filtering includes updating the state vector.

In some embodiments, when the satellite navigation receiver is approximately stationary, the position state is modeled as a random walk (e.g., in accordance with Equations (9) and (10)).

In some embodiments, the plurality of states in the state vector of the Kalman filter further includes (310) a velocity state. In some embodiments, when the satellite navigation receiver is moving with an approximately constant velocity, the velocity state is modeled as a random walk (e.g., in accordance with Equations (11) and (12)).

In some embodiments, respective bias states in the plurality of bias states corresponding to respective satellites are modeled (312) as a random walk (e.g., in accordance with Equations (16) and (17)).

In some embodiments, corrections from a tropospheric model and/or an ionospheric model are applied (316) to the pseudorange and carrier-phase measurements. In some embodiments, the plurality of states in the Kalman filter state vector includes (314) a residual tropospheric bias state, distinct from the plurality of bias states, that accounts for residual tropospheric delays after application of the corrections from the tropospheric model (e.g., in accordance with Equations (14) and (15)). The residual tropospheric bias state is satellite independent and is therefore used when determining the range to each satellite of the plurality of satellites that are in view of the satellite navigation receiver.

In some embodiments, the differential pseudorange corrections received in operation 304 are applied (318) to the pseudorange measurements. In these embodiments, a respective bias state in the plurality of bias states accounts for ambiguity and also for residual satellite clock bias, residual satellite orbital error, residual tropospheric delay, and residual ionospheric delay associated with a respective satellite in the plurality of satellites after application of the pseudorange corrections.

In some embodiments, the carrier-phase based corrections received in operation 306 are applied (320) to both the pseudorange measurements and the carrier-phase measurements. In some of these embodiments, a respective bias state in the plurality of bias states accounts for ambiguity and residual ionospheric delay associated with a respective satellite in the plurality of satellites after application of an ionospheric model. In some of these embodiments, corrections from a tropospheric model are applied to the pseudorange and carrier-phase measurements. In these embodiments, the Kalman filter may include a residual tropospheric bias state distinct from the plurality of bias states.

In some embodiments, in the absence of differential corrections to the pseudorange and carrier-phase measurements (e.g., in a stand-alone application), a respective bias state in the plurality of bias states accounts for ambiguity, residual satellite clock bias (e.g., error in the broadcast satellite clock values), satellite orbital error, tropospheric delay, and ionospheric delay associated with a respective satellite in the plurality of satellites. Corrections from a tropospheric model and/or an ionospheric model may be applied to the pseudorange and carrier-phase measurements to account for at least a portion of the tropospheric and/or ionospheric delay, in which case the respective bias state accounts for residual tropospheric and/or ionospheric delay that remains after application of the tropospheric model and/or an ionospheric model.

In some embodiments, the pseudorange and carrier-phase measurements are averaged (322) to at least partially correct for ionospheric delay. In some embodiments, this averaging is performed in the absence of corrections from an ionospheric model (e.g., in response to a determination that corrections from an ionospheric model are not available). In some embodiments, this averaging is performed in response to a determination that the ionospheric delay exceeds a first predefined criterion. For example, the first criterion may be a vertical total electron content (VTEC) of 45 TEC units, equivalent to approximately 10 meters of vertical ionospheric delay.

An estimated position of the satellite navigation receiver is updated (324) in accordance with an update to the state vector.

In some embodiments, new ephemeris data is received (330, FIG. 3B) for a respective satellite in the plurality of satellites. Based on the new ephemeris data, a jump is calculated (332) in the estimated position of the satellite navigation receiver. The bias state corresponding to the respective satellite is adjusted (334) to counteract the jump in the estimated position of the satellite navigation receiver (e.g., in accordance with Equation (19)). Counteracting position jumps ensures consistency with respect to relative positioning, which is important, for example, in machine control applications.

In some embodiments, a cycle slip is detected (340, FIG. 3C) in a carrier-phase measurement corresponding to a respective single-frequency signal from a respective satellite in the plurality of satellites. In response to detecting the cycle slip, the Kalman filter bias state corresponding to the respective satellite is reset (342).

The method 300 thus enables accurate positioning and navigation to be performed with a low-cost receiver. In some embodiments, the method 300 provides an accuracy of approximately 0.5 meters. While the method 300 includes a number of operations that appear to occur in a specific order, it should be apparent that the method 300 can include more or fewer operations, which can be executed serially or in parallel (e.g., using parallel processors or a multi-threading environment). For example, operations 302, 308, and 324 may be performed in parallel, such that pseudorange and carrier-phase measurements are calculated based on already-received data from the single-frequency signals while new data in the single-frequency signals is simultaneously being received. Furthermore, an order of two or more operations may be changed and two or more operations may be combined into a single operation.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of mitigating errors in satellite navigation measurements, the method comprising:
at a satellite navigation receiver:
receiving respective single-frequency signals from respective satellites in a plurality of satellites in a satellite navigation system;
in the absence of differential corrections, calculating pseudorange and carrier-phase measurements corresponding to respective ones of the received single-frequency signals, including filtering the pseudorange and carrier-phase measurements in a Kalman filter having a state vector comprising a plurality of states, the plurality of states including a position state, a receiver clock state, and a plurality of bias states, each bias state corresponding to a respective satellite in the plurality of satellites, the filtering including updating the state vector; and
updating an estimated position of the satellite navigation receiver in accordance with an update to the state vector;
wherein a respective bias state in the plurality of bias states accounts for ambiguity, residual satellite clock bias, satellite orbital error, and ionospheric delay associated with a respective satellite in the plurality of satellites.

2. The method of claim 1, wherein respective bias states in the plurality of bias states are modeled as a random walk.

3. The method of claim 1, wherein the plurality of states further includes a velocity state.

4. The method of claim 3, wherein:
when the satellite navigation receiver is moving with an approximately constant velocity, the velocity state is modeled as a random walk.

5. The method of claim 1, wherein:
when the satellite navigation receiver is approximately stationary, the position state is modeled as a random walk.

6. The method of claim 1, comprising:
applying corrections from a tropospheric model to the pseudorange and carrier-phase measurements to account for at least a portion of tropospheric delay;
wherein the respective bias state accounts for residual tropospheric delay that remains after application of the tropospheric model.

7. The method of claim 1, comprising:
applying corrections from an ionospheric model to the pseudorange and carrier-phase measurements to account for at least a portion of ionospheric delay;
wherein the respective bias state accounts for residual ionospheric delay that remains after application of the ionospheric model.

8. The method of claim 1, comprising:
applying corrections from an ionospheric model to the pseudorange and carrier-phase measurements;
wherein a respective bias state in the plurality of bias states accounts for ambiguity and residual ionospheric delay associated with a respective satellite in the plurality of satellites after application of the ionospheric model.

9. The method of claim 1, comprising:
applying corrections from a tropospheric model to the pseudorange and carrier-phase measurements;
wherein the plurality of states in the Kalman filter includes a residual tropospheric bias state distinct from the plurality of bias states.

10. The method of claim 1, further comprising:
averaging the pseudorange and carrier-phase measurements to at least partially correct for ionospheric delay.

11. The method of claim 10, wherein the averaging is performed in the absence of corrections from an ionospheric model.

12. The method of claim 10, wherein the averaging is performed in response to a determination that the ionospheric delay exceeds a first predefined criterion.

13. The method of claim 1, further comprising:
receiving new ephemeris data for a respective satellite in the plurality of satellites;
based on the new ephemeris data, calculating a jump in the estimated position of the satellite navigation receiver; and
adjusting the bias state corresponding to the respective satellite to counteract the jump in the estimated position of the satellite navigation receiver.

14. The method of claim 1, further comprising:
    detecting a cycle slip in a carrier-phase measurement corresponding to a respective single-frequency signal from a respective satellite in the plurality of satellites; and
    in response to detecting the cycle slip, resetting the bias state corresponding to the respective satellite.

15. A satellite navigation receiver, comprising:
    an antenna to receive respective single-frequency signals from respective satellites in a plurality of satellites in a satellite navigation system;
    memory;
    one or more processors; and
    one or more programs stored in the memory and configured for execution by the one or more processors, the one or more programs including:
        instructions to calculate, in the absence of differential corrections, pseudorange and carrier-phase measurements corresponding to respective ones of the received single-frequency signals, including instructions to filter the pseudorange and carrier-phase measurements in a Kalman filter having a state vector comprising a plurality of states, the plurality of states including a position state, a receiver clock state, and a plurality of bias states, each bias state corresponding to a respective satellite in the plurality of satellites, the instructions to filter including instructions to update the state vector; and
        instructions to update an estimated position of the satellite navigation receiver in accordance with an update to the state vector;
    wherein a respective bias state in the plurality of bias states accounts for ambiguity, residual satellite clock bias, satellite orbital error, and ionospheric delay associated with a respective satellite in the plurality of satellites.

16. A computer readable storage medium storing one or more programs for use in a satellite navigation receiver that receives respective single-frequency signals from respective satellites in a plurality of satellites in a satellite navigation system, the one or more programs configured to be executed by one or more processors in the satellite navigation receiver and comprising:
    instructions to calculate, in the absence of differential corrections, pseudorange and carrier-phase measurements corresponding to respective ones of the received single-frequency signals, including instructions to filter the pseudorange and carrier-phase measurements in a Kalman filter having a state vector comprising a plurality of states, the plurality of states including a position state, a receiver clock state, and a plurality of bias states, each bias state corresponding to a respective satellite in the plurality of satellites, the instructions to filter including instructions to update the state vector; and
    instructions to update an estimated position of the satellite navigation receiver in accordance with an update to the state vector;
    wherein a respective bias state in the plurality of bias states accounts for ambiguity, residual satellite clock bias, satellite orbital error, and ionospheric delay associated with a respective satellite in the plurality of satellites.

* * * * *